(12) United States Patent
Teraki et al.

(10) Patent No.: US 10,267,541 B2
(45) Date of Patent: Apr. 23, 2019

(54) HEAT EXCHANGE SYSTEM WITH FIXED AND VARIABLE EXPANSION DEVICES IN SERIES

(75) Inventors: Junichi Teraki, Shiga (JP); Takayuki Setoguchi, Osaka (JP)

(73) Assignee: DAIKIN INDUSTRIES, LTD., Osaka-Shi, Osaka (JP)

( * ) Notice: Subject to any disclaimer, the term of this patent is extended or adjusted under 35 U.S.C. 154(b) by 1573 days.

(21) Appl. No.: 12/446,548

(22) PCT Filed: Nov. 12, 2007

(86) PCT No.: PCT/JP2007/071944
§ 371 (c)(1),
(2), (4) Date: Apr. 21, 2009

(87) PCT Pub. No.: WO2008/059803
PCT Pub. Date: May 22, 2008

(65) Prior Publication Data
US 2010/0192624 A1    Aug. 5, 2010

(30) Foreign Application Priority Data

Nov. 13, 2006 (JP) ................................. 2006-306500

(51) Int. Cl.
F25B 31/00    (2006.01)
F25B 13/00    (2006.01)
(Continued)

(52) U.S. Cl.
CPC ............. *F25B 13/00* (2013.01); *F24F 11/77* (2018.01); *F25B 31/006* (2013.01); *F24F 11/42* (2018.01); *F24F 11/43* (2018.01); *F25B 2313/021* (2013.01); *F25B 2313/02741* (2013.01); *F25B 2341/0662* (2013.01); *F25B 2600/021* (2013.01); *Y02B 30/741* (2013.01)

(58) Field of Classification Search
CPC ................................................ F25B 2341/0662
USPC ................................ 62/150, 324.5, 527–528
See application file for complete search history.

(56) References Cited

U.S. PATENT DOCUMENTS 2,706,386 A * 4/1955 Stoner ..................... F25B 41/06
62/509
3,636,369 A * 1/1972 Harter ............................ 62/158
(Continued)

FOREIGN PATENT DOCUMENTS

CN    1504709 A    6/2000
CN    1486414 A    3/2004
(Continued)

*Primary Examiner* — Orlando E Aviles
(74) *Attorney, Agent, or Firm* — Birch, Stewart, Kolasch & Birch, LLP

(57) ABSTRACT

A heat exchange system includes an outdoor heat exchanger, an indoor heat exchanger, a compressor, an expansion valve, a capillary tube, and a cooling jacket. The compressor is provided on a first path that is one of two paths connecting the outdoor heat exchanger and the indoor heat exchanger, and the expansion valve, the capillary tube and a check valve are provided on a second path of the two paths connecting the outdoor heat exchanger and the indoor heat exchanger that is opposite to the path on which the compressor is provided. The cooling jacket for cooling an object to be cooled is provided between the expansion valve and the capillary tube.

23 Claims, 8 Drawing Sheets

(51) Int. Cl.
*F24F 11/77* (2018.01)
*F24F 11/42* (2018.01)
*F24F 11/43* (2018.01)

(56) References Cited

U.S. PATENT DOCUMENTS

| | | | | |
|---|---|---|---|---|
| 4,193,268 | A * | 3/1980 | Phillips | F25B 15/02 |
| | | | | 62/101 |
| 4,240,263 | A * | 12/1980 | Brendel | F25B 5/00 |
| | | | | 62/115 |
| 5,303,561 | A * | 4/1994 | Bahel et al. | 62/186 |
| 5,533,352 | A * | 7/1996 | Bahel et al. | 62/180 |
| 6,609,390 | B1 * | 8/2003 | Ueno | F25B 7/00 |
| | | | | 62/335 |
| 6,615,602 | B2 * | 9/2003 | Wilkinson | 62/238.7 |
| 2002/0078702 | A1 * | 6/2002 | Makizono et al. | 62/271 |
| 2003/0074914 | A1 * | 4/2003 | Hirakanu | F25B 41/06 |
| | | | | 62/324.6 |
| 2004/0050083 | A1 | 3/2004 | Yuasa et al. | |
| 2004/0159117 | A1 | 8/2004 | Wang | |
| 2005/0011215 | A1 * | 1/2005 | Gu | 62/324.1 |
| 2005/0198978 | A1 * | 9/2005 | Itsuki | F25B 1/10 |
| | | | | 62/197 |
| 2006/0162377 | A1 * | 7/2006 | Collings | 62/527 |

FOREIGN PATENT DOCUMENTS

| | | |
|---|---|---|
| EA | 1 344 997 A1 | 9/2003 |
| JP | 62-69066 A | 3/1987 |
| JP | 64-41052 U | 3/1989 |
| JP | 6-137712 A | 5/1994 |
| JP | 7-83533 A | 3/1995 |
| JP | 10-19417 A | 1/1998 |
| JP | 10-73327 A | 3/1998 |
| JP | 11-23081 A | 1/1999 |
| JP | 2002-022307 A | 1/2002 |
| JP | 2002-147917 A | 5/2002 |
| JP | 2003-139371 A | 5/2003 |
| JP | 2006-170538 A | 6/2006 |

\* cited by examiner

HEAT EXCHANGE SYSTEM WITH FIXED AND VARIABLE EXPANSION DEVICES IN SERIES

TECHNICAL FIELD

The present invention relates to heat exchange systems such as air conditioning systems.

BACKGROUND ART

For heat exchange systems such as air conditioning systems, there are techniques for cooling a secondary object to be cooled (for example, an inverter in the heat exchange system) by using the refrigerant flowing in the refrigerant passage in the heat exchange system.

For example, the heat exchange system of Patent Document 1 provides a cooling element for cooling a secondary object to be cooled, with capillary tubes placed to precede and follow the cooling element so as to adjust the temperature (intermediate temperature) of the refrigerant passing through the cooling element.

However, in such a system, the two capillary tubes preceding and following the cooling element are fixed throttles, and it is therefore difficult to adjust the temperature of the cooling element when the operating conditions of the system or the conditions of air vary. Accordingly, condensation may occur in the cooling element.

On the other hand, in the heat exchange system of Patent Document 2, two electronic expansion valves are provided in series between a condenser and an evaporator, and a cooling element is provided between the two electronic expansion valves. The electronic expansion valves are variable throttles, and so the pressure difference occurring across both ends of the cooling element can be relatively freely adjusted by adjusting the valve lifts of the two electronic expansion valves. It is therefore possible to favorably adjust the temperature of the refrigerant flowing between the two electronic expansion valves, making it possible to cool the secondary cooled object without causing condensation.

Patent Document 1: Japanese Patent Application Laid-Open No. 62-69066 (1987)

Patent Document 2: Japanese Patent Application Laid-Open No. 11-23081 (1999)

DISCLOSURE OF THE INVENTION

Problems to be Solved by the Invention

However, electronic expansion valves are more expensive than capillary tubes, and providing two electronic expansion valves inevitably leads to an increase in cost.

Accordingly, an object of the present invention is to provide a heat exchange system capable of preventing condensation from forming in the vicinity of a cooling element, while avoiding an increase in cost.

Means for Solving the Problems

According to a first aspect (1A to 1D) of the heat exchange system of the present invention, a heat exchange system comprises: a first heat exchanger (11); a second heat exchanger (12); a compressor (13) provided on a first path (PT1) that is one of two paths connecting said first heat exchanger and said second heat exchanger, said compressor compressing a refrigerant; a variable throttle (15) provided on a second path (PT2) of the two paths connecting said first heat exchanger and said second heat exchanger, said second path being a path opposite to the path on which said compressor is provided; a fixed throttle (16) provided on said second path; and a cooling element (20) that is provided on said second path and that cools an object to be cooled (30), where said cooling element (20) is located between said variable throttle (15) and said fixed throttle (16).

According to a second aspect (1C; 1D) of the heat exchange system of the present invention, the heat exchange system of the first aspect further comprises a check valve (17) provided on a bypass passage that connects a first branch position (B1; B3) and a second branch position (B2; B4) in parallel with said fixed throttle, said first branch position being on a side of one end of said fixed throttle (16) and said second branch position being on a side of the other end of said fixed throttle, wherein said check valve is provided to allow said refrigerant to flow from said first branch position (B1; B3) on the side of the end of said fixed throttle (16) that is farther from said cooling element to said second branch position (B2; B4) on the side of the end of said fixed throttle that is closer to said cooling element.

According to a third aspect (1C) of the heat exchange system of the present invention, in the heat exchange system of the second aspect, said first heat exchanger (11) functions as a condenser during cooling operation, and said fixed throttle (16) and check valve (17) are both provided between said first heat exchanger (11) and said cooling element (20).

According to a fourth aspect (1D) of the heat exchange system of the present invention, in the heat exchange system of the second aspect, said second heat exchanger (12) functions as a condenser during heating operation, and said fixed throttle (16) and check valve (17) are both provided between said second heat exchanger (12) and said cooling element (20).

According to a fifth aspect (1A; 1C) of the heat exchange system of the present invention, in the heat exchange system of any of the first to third aspects, said variable throttle (15) is provided between said second heat exchanger (12) and said cooling element (20), and during heating operation, a flow rate of said variable throttle is increased when a possibility of condensation in a vicinity of said cooling element is judged to be at or higher than a given level.

According to a sixth aspect (1A; 1C) of the heat exchange system of the present invention, in the heat exchange system of any of the first to third aspects, said variable throttle (15) is provided between said second heat exchanger (12) and said cooling element (20), and during cooling operation, a flow rate of said variable throttle is reduced when a possibility of condensation in a vicinity of said cooling element is judged to be at or higher than a given level.

According to a seventh aspect (1B; 1D) of the heat exchange system of the present invention, in the heat exchange system of the first, second or fourth aspect, said variable throttle (15) is provided between said first heat exchanger (11) and said cooling element (20), and during heating operation, a flow rate of said variable throttle is reduced when a possibility of condensation in a vicinity of said cooling element is judged to be at or higher than a given level.

According to an eighth aspect (1B; 1D) of the heat exchange system of the present invention, in the heat exchange system of the first, second or fourth aspect, said variable throttle (15) is provided between said first heat exchanger (11) and said cooling element (20), and during cooling operation, a flow rate of said variable throttle is increased when a possibility of condensation in a vicinity of said cooling element is judged to be at or higher than a given level.

According to a ninth aspect of the heat exchange system of the present invention, the heat exchange system of any of the first to eighth aspects further comprises controlling means (50) that varies a speed of rotation of a fan (11F, 12F) of at least one of said first heat exchanger and said second heat exchanger when a possibility of condensation in a vicinity of said cooling element is judged to be at or higher than a given level.

According to a tenth aspect of the heat exchange system of the present invention, in the heat exchange system of the ninth aspect, said first heat exchanger (11) is an outdoor heat exchanger that is provided outdoors, said second heat exchanger (12) is an indoor heat exchanger that is provided indoors, and said controlling means reduces the speed of rotation of the fan (11F) of said first heat exchanger (11) when the possibility of condensation in the vicinity of said cooling element is judged to be at or higher than the given level during cooling operation.

According to an eleventh aspect of the heat exchange system of the present invention, in the heat exchange system of the ninth or tenth aspect, said first heat exchanger (11) is an outdoor heat exchanger that is provided outdoors, said second heat exchanger (12) is an indoor heat exchanger that is provided indoors, and said controlling means increases the speed of rotation of the fan (12F) of said second heat exchanger (12) when the possibility of condensation in the vicinity of said cooling element is judged to be at or higher than the given level during cooling operation.

According to a twelfth aspect of the heat exchange system of the present invention, in the heat exchange system of any of the ninth to eleventh aspects, said first heat exchanger (11) is an outdoor heat exchanger that is provided outdoors, said second heat exchanger (12) is an indoor heat exchanger that is provided indoors, and said controlling means increases the speed of rotation of the fan (11F) of said first heat exchanger (11) when the possibility of condensation in the vicinity of said cooling element is judged to be at or higher than the given level during heating operation.

According to a thirteenth aspect of the heat exchange system of the present invention, in the heat exchange system of any of the ninth to twelfth aspects, said first heat exchanger (11) is an outdoor heat exchanger that is provided outdoors, said second heat exchanger (12) is an indoor heat exchanger that is provided indoors, and said controlling means reduces the speed of rotation of the fan (12F) of said second heat exchanger (12) when the possibility of condensation in the vicinity of said cooling element is judged to be at or higher than the given level during heating operation.

According to a fourteenth aspect (1E; 1F) of the heat exchange system of the present invention, a heat exchange system comprises: a first heat exchanger (11); a second heat exchanger (12); a compressor (13) provided on a first path that is one of two paths connecting said first heat exchanger and said second heat exchanger, said compressor compressing a refrigerant; a variable throttle (15) provided on a second path of the two paths connecting said first heat exchanger and said second heat exchanger, said second path being a path opposite to the path on which said compressor is provided; and a cooling element (20) that is provided on said second path and that cools an object to be cooled (30), said cooling element (20) having a fixed throttle (18) as at least part of piping inserted through said cooling element.

According to a fifteenth aspect (1E) of the heat exchange system of the present invention, in the heat exchange system of the fourteenth aspect, said variable throttle (15) is provided between said second heat exchanger (12) and said cooling element (20), and during heating operation, a flow rate of said variable throttle is increased when a possibility of condensation in a vicinity of said cooling element is judged to be at or higher than a given level.

According to a sixteenth aspect (1E) of the heat exchange system of the present invention, in the heat exchange system of the fourteenth aspect, said variable throttle (15) is provided between said second heat exchanger (12) and said cooling element (20), and during cooling operation, a flow rate of said variable throttle is reduced when a possibility of condensation in a vicinity of said cooling element is judged to be at or higher than a given level.

According to a seventeenth aspect of the heat exchange system of the present invention, in the heat exchange system of the fourteenth aspect (1F), said variable throttle (15) is provided between said first heat exchanger (11) and said cooling element (20), and during heating operation, a flow rate of said variable throttle is reduced when a possibility of condensation in a vicinity of said cooling element is judged to be at or higher than a given level.

According to an eighteenth aspect of the heat exchange system of the present invention, in the heat exchange system of the fourteenth aspect (1F), said variable throttle (15) is provided between said first heat exchanger (11) and said cooling element (20), and during cooling operation, a flow rate of said variable throttle is increased when a possibility of condensation in a vicinity of said cooling element is judged to be at or higher than a given level.

According to a nineteenth aspect of the heat exchange system of the present invention, the heat exchange system of any of the fourteenth to eighteenth aspects further comprises controlling means (50) that varies a speed of rotation of a fan of at least one of said first heat exchanger and said second heat exchanger when a possibility of condensation in a vicinity of said cooling element is judged to be at or higher than a given level.

According to a twentieth aspect of the heat exchange system of the present invention, in the heat exchange system of any of the first to nineteenth aspects, said fixed throttle is a capillary tube.

According to a twenty-first aspect of the heat exchange system of the present invention, in the heat exchange system of any of the first to twentieth aspects, said variable throttle is an opening/closing expansion valve capable of adjustment of a valve lift.

EFFECTS OF THE INVENTION

According to the first to twenty-first aspects of the heat exchange system of the present invention, it is possible to prevent condensation in the vicinity of the cooling element while avoiding an increase in cost.

In particular, according to the second aspect of the heat exchange system of the present invention, it is possible to more certainly prevent condensation both in cooling and heating operations.

According to the third, tenth and eleventh aspects of the heat exchange system of the present invention, it is possible to more certainly prevent condensation especially during cooling operation.

According to the fourth, twelfth and thirteenth aspects of the heat exchange system of the present invention, it is possible to more certainly prevent condensation especially during heating operation.

These and other objects, features, aspects and advantages of the present invention will become more apparent from the following detailed description of the present invention when taken in conjunction with the accompanying drawings.

BEST MODE FOR CARRYING OUT THE INVENTION

Figure 1:
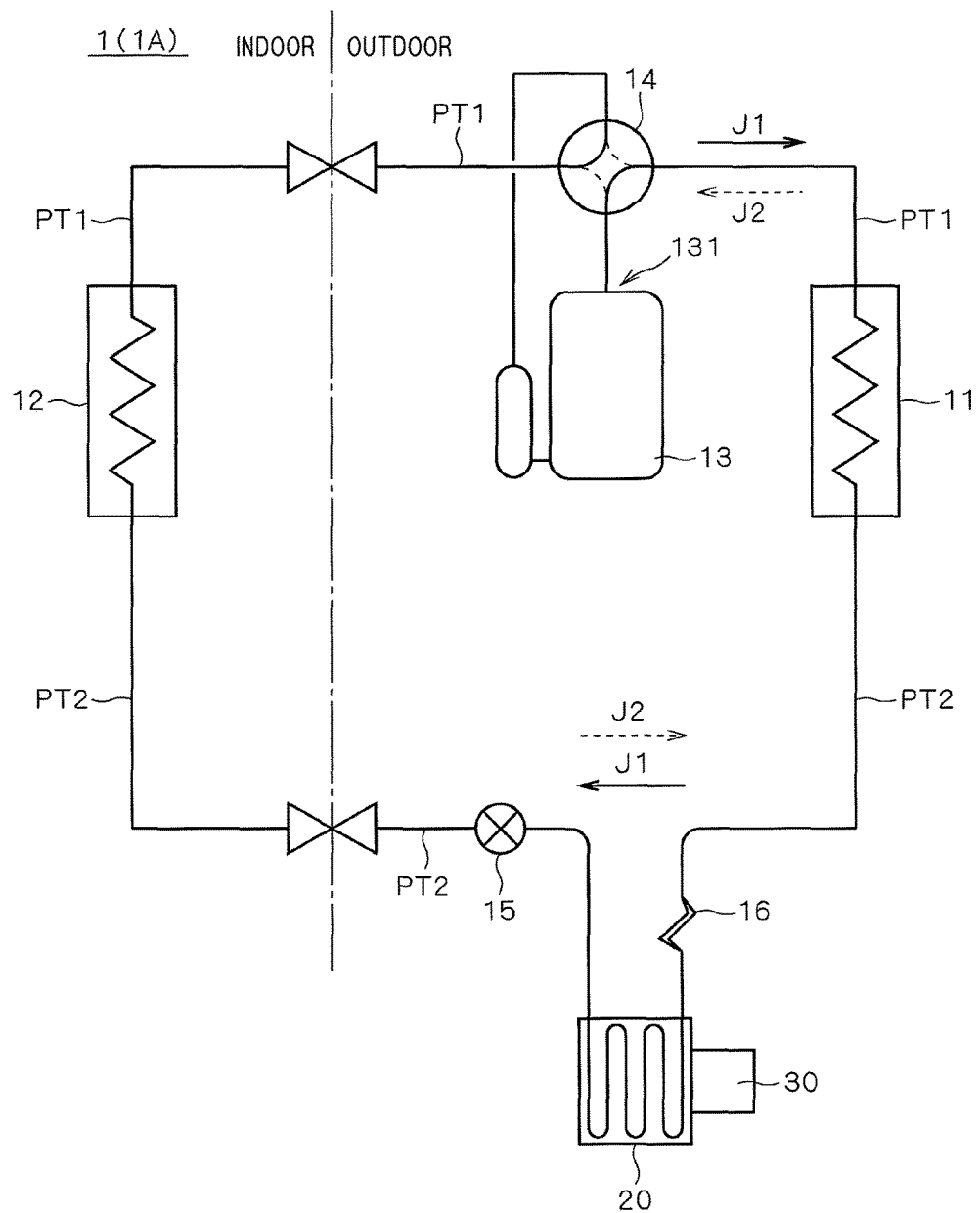
FIG. 1 is a conceptual diagram illustrating a heat exchange system according to a first preferred embodiment.

The preferred embodiments of the present invention will now be described referring to the drawings.

<1. First Preferred Embodiment>
<1-1. Outline of System>

FIG. 1 is a conceptual diagram illustrating a heat exchange system 1 (also referred to as 1A) according to a first preferred embodiment. An air conditioning system is illustrated herein as a heat exchange system.

The heat exchange system 1A includes an outdoor heat exchanger 11, an indoor heat exchanger 12, a compressor 13, a switching valve 14, an expansion valve 15, and a capillary tube 16, which form a refrigeration cycle. This heat exchange system (air conditioning system) 1A is capable of both of cooling operation for cooling the inside of a room and heating operation of heating the inside of a room. In FIG. 1, the arrow J1 of solid line shows the passage of refrigerant and the direction of flow during cooling operation, and the arrow J2 of dotted line shows (part of) the passage of refrigerant and the direction of flow during heating operation. Also, the right-hand side of the chained line shows the outdoor configuration and the left-hand side of the chain line shows the indoor configuration. These apply also to the drawings used to describe the other preferred embodiments.

The outdoor heat exchanger 11 is a heat exchanger that is provided outdoors. The outdoor heat exchanger 11 functions as a condenser during cooling operation, and functions as an evaporator during heating operation.

The indoor heat exchanger 12 is a heat exchanger that is provided indoors. The indoor heat exchanger 12 operates as an evaporator during cooling operation, and functions as a condenser during heating operation.

The compressor 13 for compressing the refrigerant is provided between the outdoor heat exchanger 11 and the indoor heat exchanger 12. Specifically, the compressor 13 is provided on one path PT1 of two paths PT1 and PT2 connecting the outdoor heat exchanger 11 and the indoor heat exchanger 12.

The switching valve 14 is provided on the path PT1 to selectively connect the discharge side 131 of the compressor 13 to the outdoor heat exchanger 11 and the indoor heat exchanger 12. Specifically, the discharge side 131 of the compressor 13 is connected to the outdoor heat exchanger 11 during cooling operation, and the discharge side 131 of the compressor 13 is connected to the indoor heat exchanger 12 during heating operation. The direction of flow of the refrigerant is thus switched between cooling operation and heating operation.

The expansion valve 15 is provided between the outdoor heat exchanger 11 and the indoor heat exchanger 12 on the path PT2, of the two paths PT1 and PT2, that is opposite to the path PT1 on which the compressor 13 is provided. The capillary tube 16 is also provided on the path PT2. The expansion valve 15 and the capillary tube 16 function as expansion mechanisms of the refrigeration cycle in this system.

The expansion valve 15 is an opening/closing expansion valve capable of adjusting the valve lift (in other words, the amount of throttling). Herein, an electronic expansion valve capable of adjustment of the valve lift by electronic control is adopted as the expansion valve 15. The capillary tube 16 is represented also as "a fixed throttle", and the expansion valve 15 is represented also as "a variable throttle".

The heat exchange system 1A further includes a cooling jacket (cooling element) 20 for cooling a secondary object to be cooled 30. The cooling jacket 20 here is provided on the path PT2 as a main path of the refrigeration cycle (i.e. not a branch path) between the expansion valve 15 and the capillary tube 16. The secondary object to be cooled 30 can be a power module provided outdoors (including an inverter circuit for driving the motor of the compressor 13), for example.

In this way, the expansion valve 15, the cooling jacket 20, and the capillary tube 16 are located in series on the path PT2.

Figure 2:
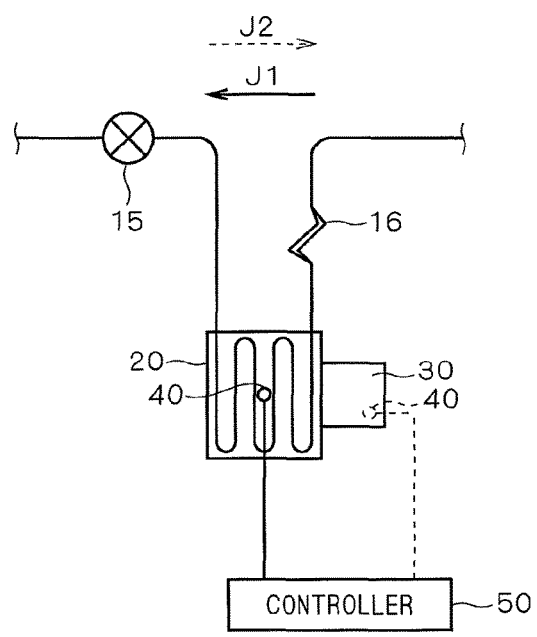
FIG. 2 is a conceptual diagram illustrating detection of humidity in the vicinity of a cooling jacket.

Also, as shown in FIG. 2, the heat exchange system 1A further includes a condensation sensor (humidity sensor) 40 and a controller 50.

The condensation sensor 40 is provided on a surface of the cooling jacket 20 to detect the relative humidity in the vicinity of that position. However, this is illustrative and not restrictive, and the condensation sensor 40 may be provided on a surface of the object to be cooled 30, for example (see the broken line in FIG. 2)

The controller 50 is capable of changing the valve lift of the expansion valve 15, the speed of rotation of the motor (not shown) in the compressor 13, the speed of rotation of the fan (not shown) of the outdoor heat exchanger 11, the speed of rotation of the fan (not shown) of the indoor heat exchanger 12, and the like.

<1-2. Operation>

First, the operation during cooling will now be described.

During cooling operation, the refrigerant flows from the indoor heat exchanger 12 to the outdoor heat exchanger 11 through the path PT1, and then flows in the opposite direction, i.e. from the outdoor heat exchanger 11 to the indoor heat exchanger 12 through the opposite path PT2.

Specifically, during cooling operation, the indoor heat exchanger 12 functions as an evaporator, and the refrigerant in the form of low-temperature low-pressure liquid absorbs indoor heat in the indoor heat exchanger 12, and evaporates to become low-temperature low-pressure gas. The low-temperature low-pressure gaseous refrigerant is compressed in the compressor 13 to become high-temperature high-pressure gas, and flows to the outdoor heat exchanger 11 through the path PT1. After that, the refrigerant dissipates heat to the outdoors in the outdoor heat exchanger 11, is condensed to become high-temperature high-pressure liquid, passes through the capillary tube 16, cooling jacket 20, and expansion valve 15 on the path PT2 in this order, and reaches the indoor heat exchanger 12 as low-temperature low-pressure liquid. This operation is performed cyclically.

Now, the refrigerant on the path PT2 is expanded by the above-described two kinds of expansion mechanisms 15 and 16. Specifically, during cooling operation, the refrigerant condensed in the outdoor heat exchanger 11 expands in the capillary tube 16, passes through the cooling jacket 20, further expands also in the expansion valve 15, and reaches the indoor heat exchanger 12. In this process, the refrigerant flowing out from the capillary tube 16 to reach the expansion valve 15 cools the cooling jacket 20, and thus cools the secondary object to be cooled 30 provided on the cooling jacket 20.

Next, the operation during heating will be described.

During heating operation, the refrigerant passes from the outdoor heat exchanger 11 to the indoor heat exchanger 12 through the path PT1, and then flows in the opposite direction, i.e. from the indoor heat exchanger 12 to the outdoor heat exchanger 11 through the opposite path PT2.

Specifically, during heating operation, the outdoor heat exchanger 11 functions as an evaporator, and the refrigerant in the form of low-temperature low-pressure liquid absorbs outdoor heat in the outdoor heat exchanger 11, and evaporates to become low-temperature low-pressure gas. The low-temperature low-pressure gaseous refrigerant is compressed in the compressor 13 to become high-temperature high-pressure gas, and flows to the indoor heat exchanger 12 through the path PT1. After that, the refrigerant dissipates heat to the indoors in the indoor heat exchanger 12, is condensed to become high-temperature high-pressure liquid, passes through the expansion valve 15, cooling jacket 20, and capillary tube 16 on the path PT2 in this order, and reaches the outdoor heat exchanger 11 as low-temperature low-pressure liquid. In more detail, the refrigerant condensed in the indoor heat exchanger 12 expands in the expansion valve 15, passes through the cooling jacket 20, further expands also in the capillary tube 16, and reaches the outdoor heat exchanger 11. In this process, the refrigerant flowing out from the expansion valve 15 to reach the capillary tube 16 cools the cooling jacket 20, and thus cools the secondary object to be cooled 30 provided on the cooling jacket 20.

In both of the above-described operations during cooling and heating, the refrigerant expands in two steps while passing through the expansion valve 15 and the capillary tube 16 on the path PT2. Then, as the refrigerant expands, the pressure of the refrigerant decreases and the temperature of the refrigerant also decreases.

Accordingly, during cooling operation, for example, the temperature T1 of the refrigerant when flowing out from the capillary tube 16 into the expansion valve 15 is an intermediate temperature between the temperature of the high-temperature high-pressure refrigerant before flowing into the capillary tube 16 and the temperature of the low-temperature low-pressure refrigerant after flowing out of the expansion valve 15. It is thus possible to avoid a decrease in the refrigerant's temperature T1 to or below the dew point, and to prevent condensation in the vicinity of the cooling jacket 20.

Also, during heating operation, the temperature T2 of the refrigerant when flowing out from the expansion valve 15 into the capillary tube 16 is an intermediate temperature between the temperature of the high-temperature high-pressure refrigerant before flowing into the expansion valve 15 and the temperature of the low-temperature low-pressure refrigerant after flowing out of the capillary tube 16. It is thus possible to avoid a decrease in the refrigerant's temperature T2 to or below the dew point, and to prevent condensation in the vicinity of the cooling jacket 20.

In particular, in both of cooling and heating operations, the temperatures T1 and T2 of the refrigerant flowing between the expansion valve 15 and the capillary tube 16 are intermediate between the temperature of high-temperature high-pressure refrigerant and the temperature of low-temperature low-pressure refrigerant, and they are higher than those of the low-temperature low-pressure refrigerant. Accordingly, in both of cooling and heating operations, it is possible to avoid a decrease in the refrigerant's temperature T1 to or below the dew point, and to prevent condensation in the vicinity of the cooling jacket 20.

Also, with the two expansion mechanisms of the heat exchange system 1A (i.e. the expansion valve 15 and the capillary tube 16), one expansion mechanism or the capillary tube 16 is a fixed throttle, but the other expansion mechanism or the expansion valve 15 is a variable throttle. Accordingly, in the heat exchange system 1A, the adjustment of temperature in the cooling jacket 20 is easier than when two fixed throttles (e.g. two capillary tubes) are provided as two expansion mechanisms. It is thus possible to more certainly prevent condensation in the vicinity of the cooling jacket 20.

More specifically, the valve lift of the expansion valve 15 can be varied by the controller 50 (see FIG. 2) of the heat exchange system 1A according to the relative humidity in the vicinity of the cooling jacket 20 measured by the condensation sensor 40.

For example, during heating operation, the valve lift of the expansion valve 15 can be increased (in other words, the flow rate in the expansion valve 15 can be increased) as the relative humidity measured by the condensation sensor 40 increases. This suppresses the amount of pressure reduction and the temperature decrease in the expansion valve 15, to suppress the decrease in the intermediate temperature T1, thus preventing condensation.

Also, during cooling operation, the valve lift of the expansion valve 15 can be reduced (in other words, the flow rate in the expansion valve 15 can be reduced) as the relative humidity measured by the condensation sensor 40 increases. This reduces the total flow rate of the refrigerant, and reduces the amount of pressure reduction and the temperature decrease in the capillary tube 16, to suppress the decrease in temperature in the capillary tube 16. This suppresses the decrease in intermediate temperature T1, thus preventing condensation.

Such operations of adjusting the valve lift of the expansion valve 15 make it possible to more certainly prevent condensation in the vicinity of the cooling jacket 20.

Also, in the heat exchange system 1A, the relatively expensive expansion valve 15 is used as one of the two expansion mechanisms, but the relatively inexpensive capillary tube 16 is used as the other expansion mechanism. This avoids an increase in cost of the heat exchange system 1A.

<2. Second Preferred Embodiment>

A second preferred embodiment is a modification of the first preferred embodiment.

Figure 3:
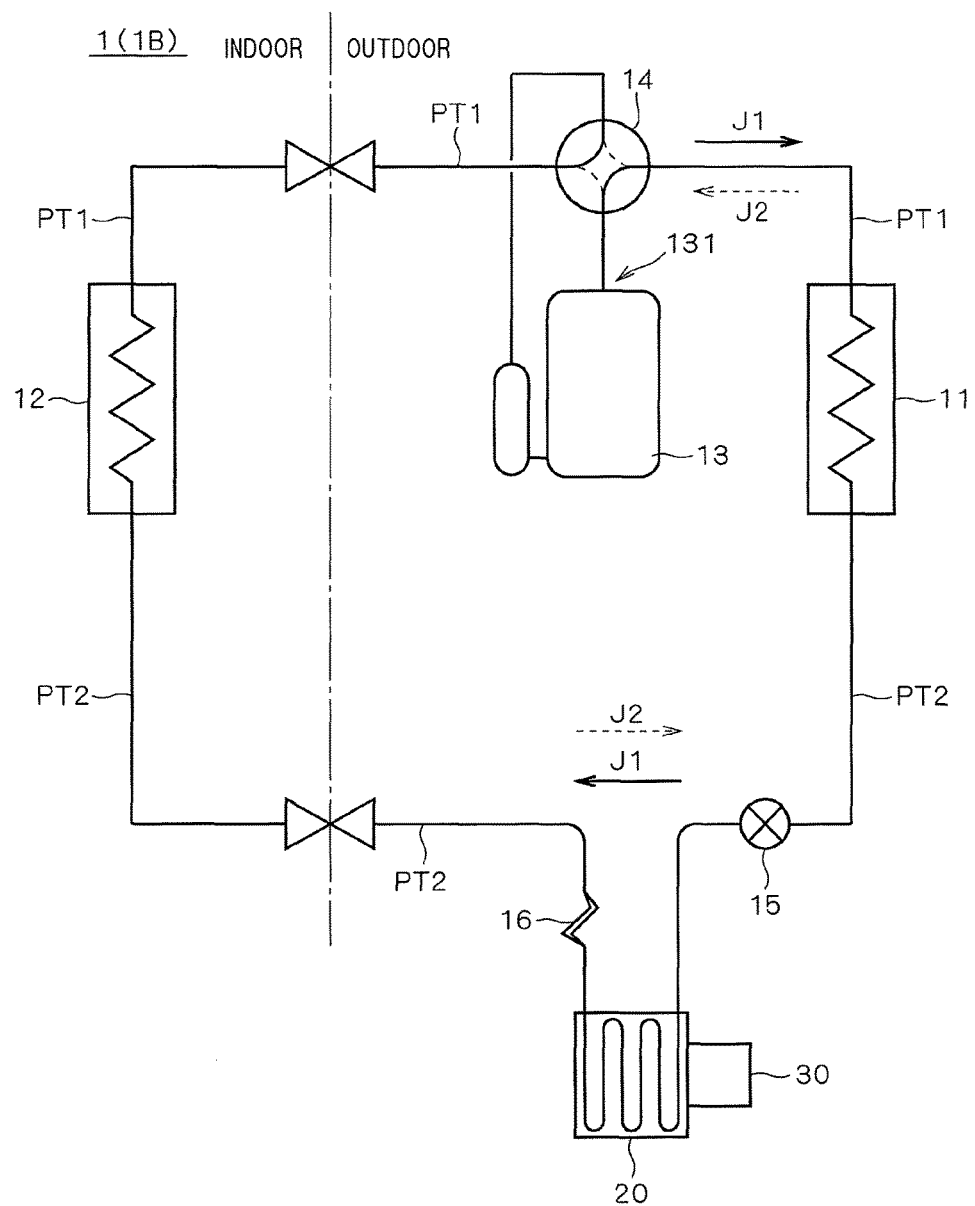
FIG. 3 is a conceptual diagram illustrating a heat exchange system according to a second preferred embodiment.

As shown in FIG. 3, on a path TP2 connecting an outdoor heat exchanger 11 and an indoor heat exchanger 12 in a heat exchange system 1B of the second preferred embodiment, an expansion valve 15, a cooling jacket 20, and a capillary tube 16 are located in a reverse order to those of the first preferred embodiment. That is, the cooling jacket 20 is located on the path PT2, and the expansion valve 15 is located between the cooling jacket 20 and the outdoor heat exchanger 11, and the capillary tube 16 is located between the cooling jacket 20 and the indoor heat exchanger 12.

Like the heat exchange system 1A, the heat exchange system 1B thus configured, too, makes it possible to prevent condensation in the vicinity of the cooling jacket 20 while avoiding an increase in cost.

Also, in the heat exchange system 1B, the condensation can be more certainly prevented by changing the valve lift of the expansion valve 15 according to the relative humidity in the vicinity of the cooling jacket 20 measured by a condensation sensor 40.

For example, during cooling operation, the valve lift of the expansion valve 15 can be increased (in other words, the flow rate in the expansion valve 15 can be increased) as the relative humidity measured by the condensation sensor 40 increases. This suppresses the amount of pressure reduction and the temperature decrease in the expansion valve 15, to suppress the decrease in the intermediate temperature T1, thus preventing condensation.

Also, during heating operation, the valve lift of the expansion valve 15 can be reduced (in other words, the flow rate in the expansion valve 15 can be reduced) as the relative humidity measured by the condensation sensor 40 increases. This reduces the total flow rate of the refrigerant, and reduces the amount of pressure reduction and the temperature decrease in the capillary tube 16, to suppress the decrease in temperature in the capillary tube 16. This suppresses the decrease in intermediate temperature T1, thus preventing condensation.

<3. Third Preferred Embodiment>

A third preferred embodiment is a modification of the first preferred embodiment.

Figure 4:
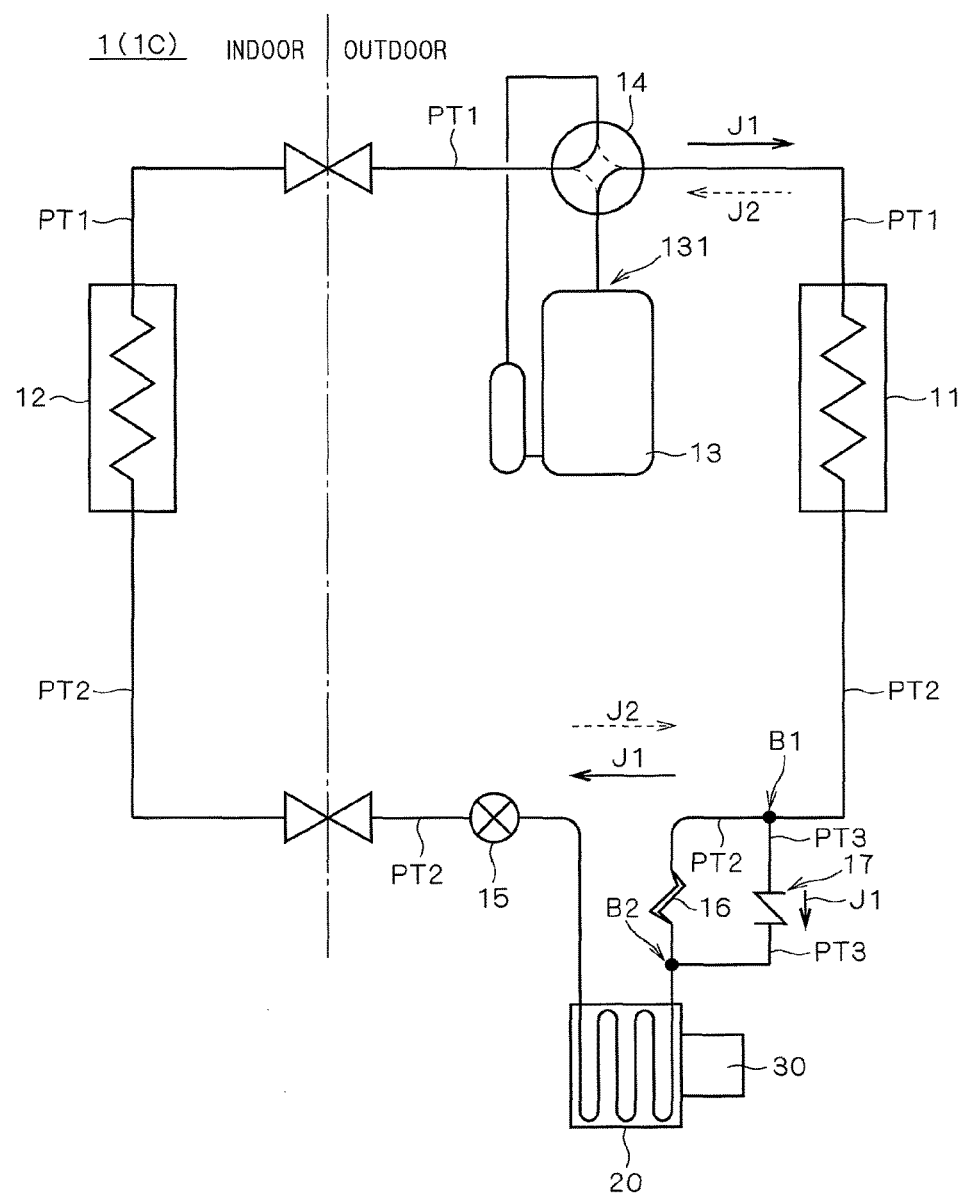
FIG. 4 is a conceptual diagram illustrating a heat exchange system according to a third preferred embodiment.

As shown in FIG. 4, in a heat exchange system 1C of the third preferred embodiment, a bypass passage PT3 is provided to connect a branch position B1 on the side of one end of the capillary tube 16 and a branch position B2 on the side of the other end of the capillary tube 16. This bypass passage PT3 is a passage that connects the two branch positions B1 and B2 in parallel with the capillary tube 16.

A check valve 17 is provided on the bypass passage PT3. Thus, the capillary tube 16 and the check valve 17 are both located between the outdoor heat exchanger 11 and the cooling jacket 20.

The check valve 17 restricts the direction of flow of the refrigerant. Specifically, the branch position B1 is located on the side of one of both ends of the capillary tube 16 that is separated farther from the cooling jacket 20, and the check valve 17 allows the refrigerant to flow from the branch position B1 to the branch position B2 located on the side of the end closer to the cooling jacket 20, and it blocks the flow of the refrigerant in the opposite direction. That is, the check valve 17 is provided such that the refrigerant flows only in the direction from the branch position B1 to the branch position B2.

Accordingly, when the refrigerant passes on the path PT2 from the outdoor heat exchanger 11 to the indoor heat exchanger 12 during cooling operation, the refrigerant flows to the cooling jacket 20 through the check valve 17 without through the capillary tube 16. Accordingly, during cooling operation, the temperature T1 of the refrigerant passing through the cooling jacket 20 is approximately equal to that of the high-temperature high-pressure refrigerant flowing out from the outdoor heat exchanger 11. This avoids a decrease in the refrigerant's temperature T1 to or below the dew point, and prevents condensation in the vicinity of the cooling jacket 20.

During heating operation, operations similar to those described in the first preferred embodiment are performed. In particular, when the refrigerant passes on the path PT2 from the cooling jacket 20 to the outdoor heat exchanger 11, the refrigerant flows through the capillary tube 16 without flowing through the check valve 17.

The heat exchange system 1C thus configured also prevents condensation in the vicinity of the cooling jacket 20 while avoiding an increase in cost. Additionally providing the check valve 17 as shown in the heat exchange system 1C involves lower costs than when two expansion valves 15 are provided.

Also, the heat exchange system 1C is capable of more certainly preventing condensation both during cooling and heating operations. In particular, during the summer when the system is used for cooling, outside air is often hot and humid; however, even under such circumstances, the cooling jacket 20 is kept at relatively high temperatures and condensation is more certainly prevented. That is, it is possible to more certainly prevent condensation during cooling operation.

Also, providing the check valve 17 as described above eliminates the need to consider the amount of pressure reduction in the capillary tube 16 during cooling operation, and what is needed is just to consider the amount of pressure reduction (and the amount of temperature decrease) in the capillary tube 16 during heating operation. That is, a capillary tube having an amount of pressure reduction suitable for preventing condensation during heating operation can be adopted as the capillary tube 16.

<4. Fourth Preferred Embodiment>

A fourth preferred embodiment is a modification of the configuration of the second preferred embodiment, to which the idea of the third preferred embodiment is applied.

Figure 5:
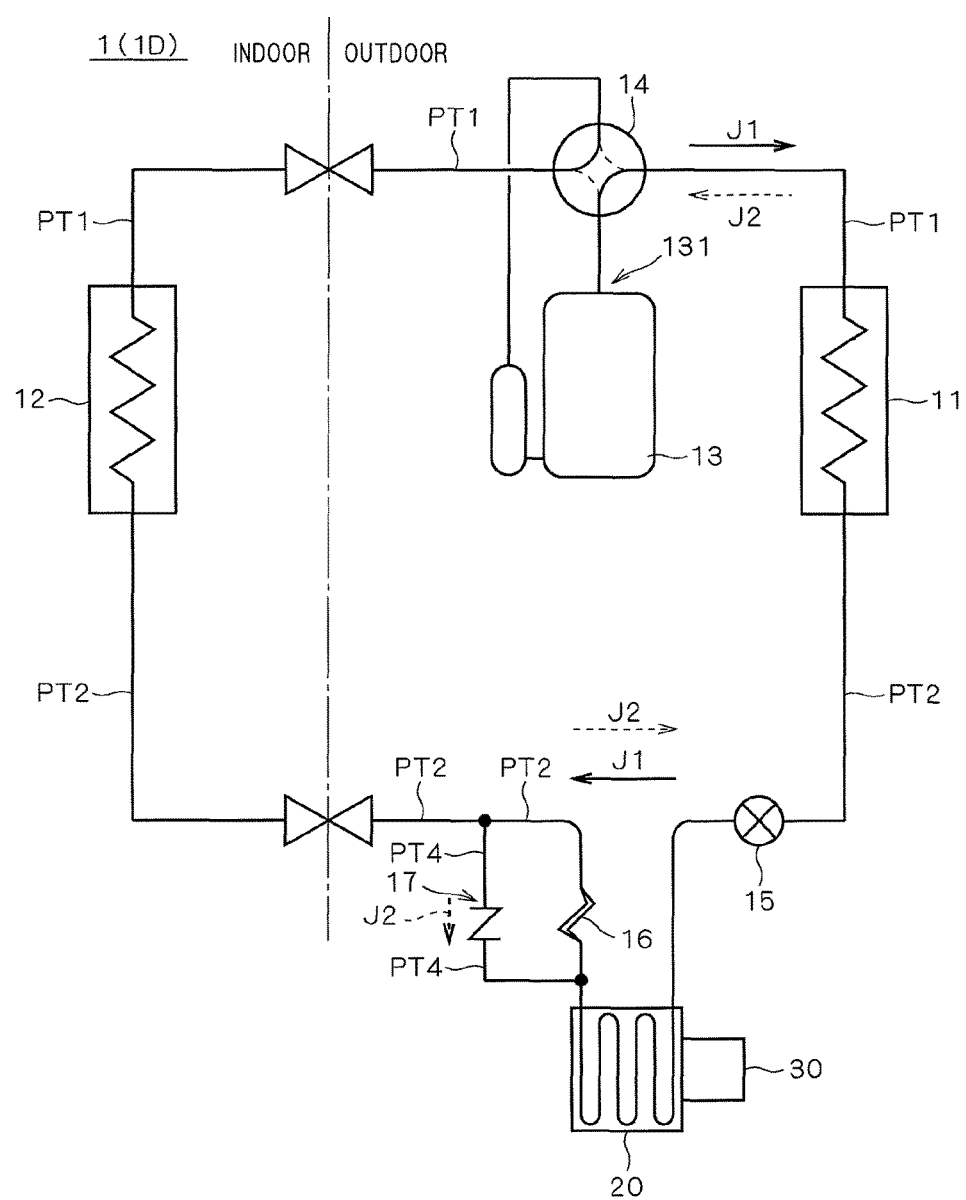
FIG. 5 is a conceptual diagram illustrating a heat exchange system according to a fourth preferred embodiment.

FIG. 5 is a conceptual diagram illustrating the configuration of a heat exchange system 1D according to the fourth preferred embodiment.

As shown in FIG. 5, like the heat exchange system 1B (see FIG. 3) of the second preferred embodiment, the heat exchange system 1D includes an expansion valve 15 provided between a cooling jacket 20 and an outdoor heat exchanger 11, and a capillary tube 16 provided between the cooling jacket 20 and an indoor heat exchanger 12.

The heat exchange system 1D further includes a bypass passage PT4 provided to connect a branch position B3 on the side of one end of the capillary tube 16 and a branch position B4 on the side of the other end of the capillary tube 16. This bypass passage PT4 is a passage that connects the two branch positions B3 and B4 in parallel with the capillary tube 16.

A check valve 17 is provided on the bypass passage PT4. Thus, the capillary tube 16 and the check valve 17 are both located between the indoor heat exchanger 12 and the cooling jacket 20.

The check valve 17 restricts the direction of flow of the refrigerant. Specifically, the branch position B3 is located at one of both ends of the capillary tube 16 that is separated farther from the cooling jacket 20, and the check valve 17 allows the refrigerant to flow from the branch position B3 to the branch position B4 at the end closer to the cooling jacket 20, and it blocks the flow of the refrigerant in the opposite direction. That is, the check valve 17 is located such that the refrigerant flows only in the direction from the branch position B3 to the branch position B4.

Accordingly, when the refrigerant passes on the path PT2 from the indoor heat exchanger 12 to the outdoor heat exchanger 11 during heating operation, the refrigerant flows to the cooling jacket 20 through the check valve 17 without through the capillary tube 16. Accordingly, during heating operation, the temperature T2 of the refrigerant passing through the cooling jacket 20 is approximately equal to that of the high-temperature high-pressure refrigerant flowing out from the indoor heat exchanger 12. This avoids a decrease in the refrigerant's temperature T2 to or below the dew point, and prevents condensation in the vicinity of the cooling jacket 20.

During cooling operation, operations similar to those described in the second preferred embodiment are performed. In particular, when the refrigerant passes on the path PT2 from the cooling jacket 20 to the indoor heat exchanger 12, the refrigerant flows through the capillary tube 16 without through the check valve 17.

The heat exchange system 1D thus configured also prevents condensation in the vicinity of the cooling jacket 20 while avoiding an increase in cost.

Also, the heat exchange system 1D is capable of more certainly preventing condensation both in cooling and heating operations. In particular, condensation is more certainly prevented by keeping the cooling jacket 20 at relatively high temperatures during heating operation. That is, the condensation is more certainly prevented during heating operation.

Furthermore, there is no need to consider the amount of pressure reduction in the capillary tube 16 during heating operation, and what is needed is just to consider the amount of pressure reduction in the capillary tube 16 during cooling operation. That is, a capillary tube having an amount of pressure reduction suitable for preventing condensation during cooling operation can be adopted as the capillary tube 16.

<5. Fifth Preferred Embodiment>

Figure 6:
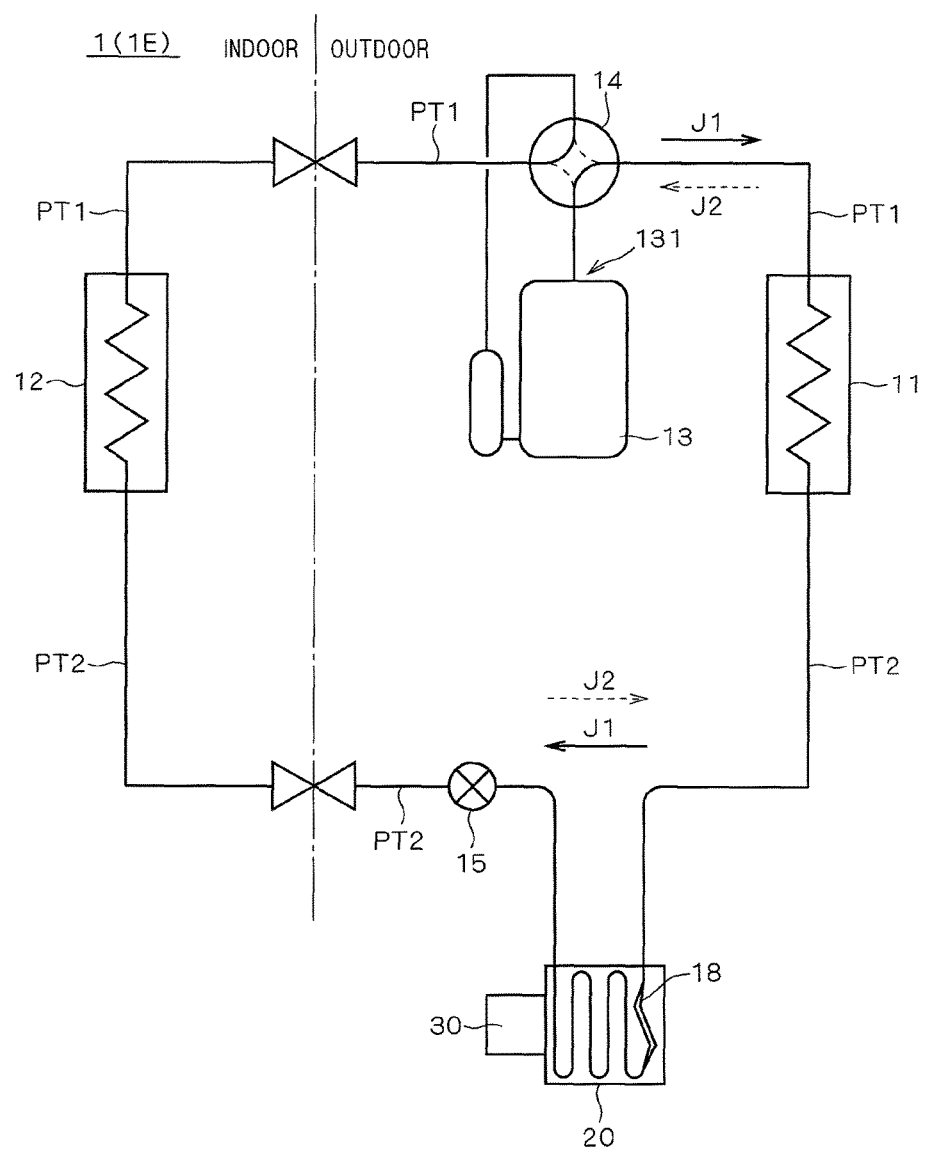
FIG. 6 is a conceptual diagram illustrating a heat exchange system according to a fifth preferred embodiment.

A fifth preferred embodiment is a modification of the first preferred embodiment. FIG. 6 is a conceptual diagram illustrating the configuration of a heat exchange system 1E of the fifth preferred embodiment.

The heat exchange system 1E has commonality with the heat exchange system 1A of the first preferred embodiment in that an expansion valve 15 is provided on a path PT2 between a cooling jacket 20 and an indoor heat exchanger 12, but it differs from the heat exchange system 1A in that a capillary tube is provided inside the cooling jacket 20.

In this heat exchange system 1E, the cooling jacket 20 for cooling the object to be cooled 30 has a capillary tube 18 as part of the piping inserted through inside the cooling jacket 20. In more detail, the capillary tube 18 is provided in a position closer to the indoor heat exchanger 12, in the piping inserted through the cooling jacket 20.

This heat exchange system 1E is also capable of preventing condensation in the vicinity of the cooling jacket 20 while avoiding an increase in cost.

In this case, in the cooling jacket 20, condensation is most likely to occur in the vicinity of the outlet of the capillary tube 18 that is located on the side closer to the outdoor heat exchanger 11. It is therefore preferable, in order to prevent condensation, to attach the object to be cooled 30 as far as possible from the outlet of the capillary tube 18 on the side of the outdoor heat exchanger 11. Specifically, it is preferable to attach the object to be cooled 30 on the cooling jacket 20 in a position opposite to the outlet of the capillary tube 18 on the side closer to the outdoor heat exchanger 11, e.g. in a position closer to the expansion valve 15.

FIG. 6 illustrates a structure in which the capillary tube 18 is provided as part of the piping inserted through inside the cooling jacket 20, but this is illustrative and not restrictive. For example, the capillary tube 18 may be provided as the entirety of the piping inserted through inside the cooling jacket 20.

<6. Sixth Preferred Embodiment>

Figure 7:
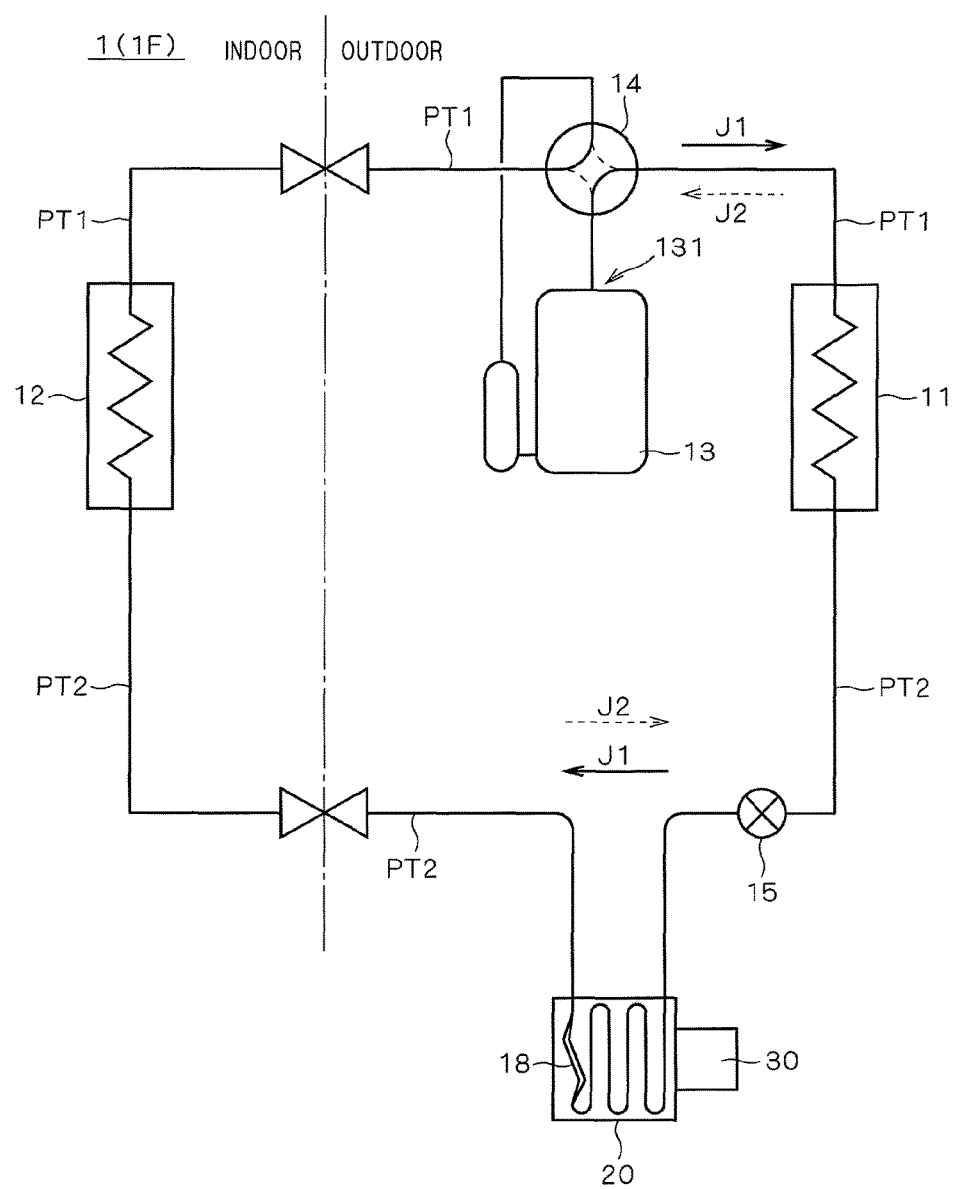
FIG. 7 is a conceptual diagram illustrating a heat exchange system according to a sixth preferred embodiment.
Figure 8:
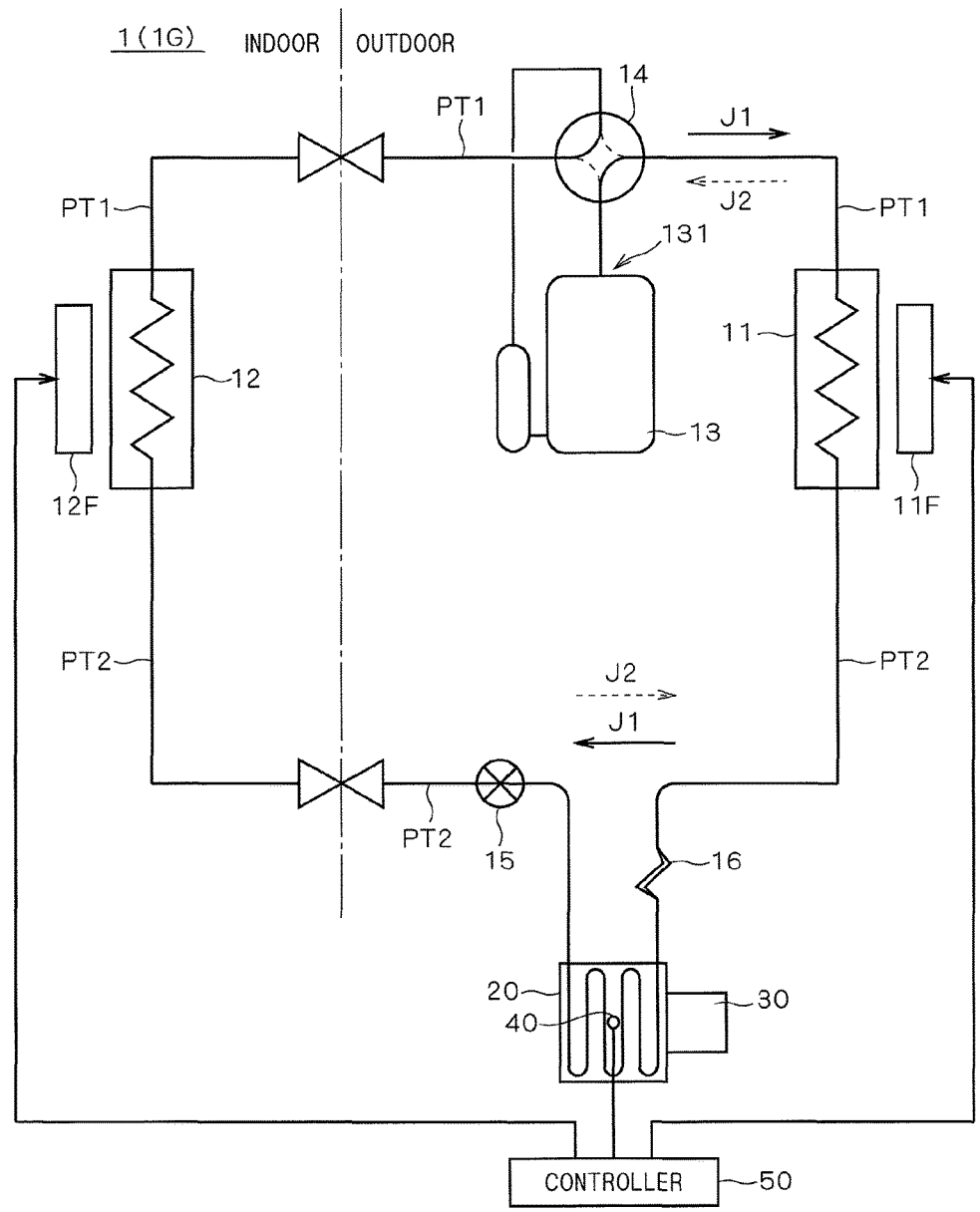
FIG. 8 is a conceptual diagram illustrating a heat exchange system according to a seventh preferred embodiment.

A sixth preferred embodiment is a modification of the second preferred embodiment. FIG. 7 is a conceptual diagram illustrating the configuration of a heat exchange system 1F of the sixth preferred embodiment.

The heat exchange system 1F has commonality with the heat exchange system 1B of the second preferred embodiment in that an expansion valve 15 is provided on a path PT2 between a cooling jacket 20 and an outdoor heat exchanger 11, but it differs from the heat exchange system 1B in that a capillary tube is provided inside the cooling jacket 20.

In this heat exchange system 1F, the cooling jacket 20 for cooling the object to be cooled 30 has a capillary tube 18 as piping inserted through the cooling jacket 20.

This heat exchange system 1F is also capable of preventing condensation in the vicinity of the cooling jacket 20 while avoiding an increase in cost.

FIG. 7 illustrates a structure in which part of the inserted through inside the cooling jacket 20 functions as the capillary tube 18, but this is illustrative and not restrictive. For example, the entirety of the piping inserted through inside the cooling jacket 20 may function as the capillary tube 18.

<7. Seventh Preferred Embodiment>

A seventh preferred embodiment is a modification of the first preferred embodiment. A heat exchange system 1G of the seventh preferred embodiment has a configuration like that of the heat exchange system 1A of the first preferred embodiment. However, the presence of a fan 11F of the outdoor heat exchanger 11 and a fan 12F of the indoor heat exchanger 12 is depicted clearly. It does not mean that the other heat exchange systems 1A to 1E do not need the fans 11F and 12F, but FIGS. 1 to 7 do not show them just because describing the operations of the fans 11F and 12F was not necessary in the first to sixth preferred embodiments where the heat exchange systems 1A to 1E are described.

The seventh preferred embodiment illustrates a technique for more certainly preventing condensation by appropriately changing the speeds of rotation of the fans 11F and 12F.

A controller 50 of the heat exchange system of the seventh preferred embodiment judges whether the possibility of occurrence of condensation in the vicinity of the cooling jacket 20 is at or higher than a given level, or not, on the basis of the measurements by a condensation sensor 40. More specifically, the possibility of condensation can be judged to be at or more than a given level when a condition C1 that the relative humidity measured by the condensation sensor 40 is larger than a given threshold (e.g. 90%) is satisfied.

When judging that the possibility of condensation is at or more than a given level, the controller 50 changes the speeds of rotation of the fans 11F and 12F so that the temperature of the refrigerant in the vicinity of the cooling jacket 20 rises.

Specifically, operations shown below are performed depending on the condition of operation (depending on whether the operation is cooling or heating).

First, the operation during cooling will be described. Table 1 illustrates variations of rotating speeds of the fans 11F and 12F during cooling operation.

TABLE 1

<During Cooling Operation>

| | Rotating speed of fan 11F | Rotating speed of fan 12F |
|---|---|---|
| Condition C1 satisfied | Reduce (−ΔV1) | Increase (+ΔV2) |

As shown in Table 1, the speed of rotation of the fan 11F of the outdoor heat exchanger 11 can be reduced when the condition C1 is judged to be satisfied during cooling operation. For example, the speed of rotation of the fan 11F can be reduced by a given amount ΔV1 (−ΔV1). Then, the temperature of the refrigerant becomes relatively high because of a reduction of heat dissipation to the outside in the outdoor heat exchanger 11, and the occurrence of condensation in the vicinity of the cooling jacket 20 is more certainly prevented during cooling operation.

In place of "reducing the speed of rotation of the fan 11F", the speed of rotation of the fan 12F of the indoor heat exchanger 12 may be increased. For example, when the condition C1 is judged to be satisfied during cooling operation, the speed of rotation of the fan 12F may be increased by a given amount ΔV2 (+ΔV2). Then, the temperature of the refrigerant becomes relatively high because of an increase in the amount of heat absorption from the indoors in the indoor heat exchanger 12, and the occurrence of condensation in the vicinity of the cooling jacket 20 is more certainly prevented during cooling operation.

Alternatively, both of the operations of "reducing the speed of rotation of the fan 11F" and "increasing the speed of rotation of the fan 12F" may be conducted when the condition C1 is judged to be satisfied during cooling operation.

Next, operations during heating will be described. Table 2 illustrates variations of the rotating speeds of the fans 11F and 12F during heating operation.

TABLE 2

<During Heating Operation>

| | Rotating speed of fan 11F | Rotating speed of fan 12F |
|---|---|---|
| Condition C1 satisfied | Increase (+ΔV3) | Reduce (−ΔV4) |

As shown in Table 2, the speed of rotation of the fan of the outdoor heat exchanger 11 may be increased when the condition C1 is judged to be satisfied during heating operation. For example, the speed of rotation of the fan 11F is increased by a given amount ΔV3 (+ΔV3). Then, the temperature of the refrigerant becomes relatively high because of an increase in the amount of heat absorption from the outside in the outdoor heat exchanger 11, and the occurrence of condensation in the vicinity of the cooling jacket 20 is more certainly prevented during heating operation.

In place of "increasing the speed of rotation of the fan 11F", the speed of rotation of the fan of the indoor heat exchanger 12 may be reduced. For example, when the condition C1 is judged to be satisfied during heating operation, the speed of rotation of the fan 12F may be reduced by a given amount ΔV4 (−ΔV4). Then, the temperature of the refrigerant becomes relatively high because of a reduction in the amount of heat dissipation into the indoors in the indoor heat exchanger 12, and the occurrence of condensation in the vicinity of the cooling jacket 20 is more certainly prevented during heating operation.

Alternatively, both of the operations of "increasing the speed of rotation of the fan 11F" and "reducing the speed of rotation of the fan 12F" may be conducted when the condition C1 is judged to be satisfied during heating operation.

<8. Others>

The seventh preferred embodiment has described an example which, in the first preferred embodiment, varies the speed of rotation of at least one of the fan 11F of the outdoor heat exchanger 11 and the fan 12F of the indoor heat exchanger 12, but this is illustrative and not restrictive. For example, the idea of the seventh preferred embodiment may be applied to the fifth and sixth preferred embodiments. Specifically, in the heat exchange systems 1E and 1F, the speed of rotation of at least one of the fan 11F and the fan 12F may be varied when the possibility of condensation in the vicinity of the cooling jacket 20 is judged to be at or higher than a given level.

Also, the seventh preferred embodiment has described an example that varies the speed(s) of rotation of the fan 11F and/or the fan 12F by given amounts (−ΔV1, +ΔV2, −ΔV3, +ΔV4) when the possibility of condensation in the vicinity of the cooling jacket 20 is judged to be at or higher than a given level, but this is illustrative and not restrictive. For example, the possibility of condensation may be estimated in multiple levels and the amount of variation of rotating speed may be varied according to the level. In more detail, the amount of variation of the rotating speed(s) may be enlarged as the possibility of condensation increases. This more certainly prevents condensation.

Also, the first preferred embodiment etc. have described examples in which the valve lift of the expansion valve 15 is varied according to the relative humidity measured by the condensation sensor 40, without considering the possibility of condensation, but this is illustrative and not restrictive. For example, the valve lift of the expansion valve 15 may be varied when the possibility of condensation is judged to be at or higher than a given level.

Also, the preferred embodiments above have described examples in which the condensation sensor 40 is provided in the vicinity of the cooling jacket 20 and a judgment is made as to whether the possibility of condensation is at or higher than a given level, or not, but this is illustrative and not restrictive. For example, a configuration as illustrated below may be adopted.

Specifically, an outdoor temperature sensor and an outdoor humidity sensor are provided in the vicinity of the outdoor heat exchanger 11, and the temperature of dew point of outside air is calculated on the basis of the temperature measured by the outdoor temperature sensor and the humidity measured by the outdoor humidity sensor. At the same time, a temperature sensor is further provided in the vicinity of the cooling jacket 20 (for example, on a surface of the object to be cooled 30) to measure the temperature in the vicinity of the cooling jacket 20. Then, the possibility of condensation can be judged to be at or higher than a given level when the temperature measured in the vicinity of the cooling jacket 20 is lower than the dew-point temperature of outside air.

In such a configuration, without providing an outdoor humidity sensor, the relative humidity of outside air may be assumed to be a given value (e.g. 90%), and the dew-point temperature may be calculated by using the assumed value of outside air humidity and the measured value of outside air temperature.

While the invention has been described in detail, the foregoing description is in all aspects illustrative and not restrictive. It is understood that numerous other modifications and variations can be devised without departing from the scope of the invention.

The invention claimed is:

1. A heat exchange system comprising:
    a first heat exchanger;
    a second heat exchanger;
    a compressor provided on a first path that is one of two paths connecting said first heat exchanger and said second heat exchanger, said compressor compressing a refrigerant;
    a variable throttle provided on a second path of the two paths connecting said first heat exchanger and said second heat exchanger, said second path being a path opposite to the path on which said compressor is provided;
    a permanently fixed throttle provided on said second path; and
    a cooling element that is provided on said second path and that cools a power module including an inverter circuit for driving a motor of the compressor;
    said cooling element being located between said variable throttle and said permanently fixed throttle, wherein
    said variable throttle and said permanently fixed throttle are located in series on said second path, and
    refrigerant that flows through one of the permanently fixed throttle and the variable throttle flows into to the cooling element, and then flows to the other one of the permanently fixed throttle or the variable throttle, in this order.

2. The heat exchange system according to claim 1, wherein
    said variable throttle is provided between said second heat exchanger and said cooling element, and
    the heat exchange system is configured, during heating operation, to increase a flow rate of said variable throttle when a possibility of condensation in a vicinity of said cooling element is judged to be at or higher than a given level.

3. The heat exchange system according to claim 1, wherein
    said variable throttle is provided between said second heat exchanger and said cooling element, and
    the heat exchange system is configured, during cooling operation, to reduce a flow rate of said variable throttle when a possibility of condensation in a vicinity of said cooling element is judged to be at or higher than a given level.

4. The heat exchange system according to claim 1, wherein
    said variable throttle is provided between said first heat exchanger and said cooling element, and
    the heat exchange system is configured, during heating operation, to reduce a flow rate of said variable throttle when a possibility of condensation in a vicinity of said cooling element is judged to be at or higher than a given level.

5. The heat exchange system according to claim 1, wherein
    said variable throttle is provided between said first heat exchanger and said cooling element, and
    the heat exchange system is configured, during cooling operation, to increase a flow rate of said variable throttle when a possibility of condensation in a vicinity of said cooling element is judged to be at or higher than a given level.

6. The heat exchange system according to claim 1, further comprising a controller that varies a speed of rotation of a fan of at least one of said first heat exchanger and said second heat exchanger when a possibility of condensation in a vicinity of said cooling element is judged to be at or higher than a given level.

7. The heat exchange system according to claim 6, wherein said first heat exchanger is an outdoor heat exchanger that is provided outdoors,
    said second heat exchanger is an indoor heat exchanger that is provided indoors, and
    said controller reduces the speed of rotation of the fan of said first heat exchanger when the possibility of condensation in the vicinity of said cooling element is judged to be at or higher than the given level during cooling operation.

8. The heat exchange system according to claim 6, wherein
    said first heat exchanger is an outdoor heat exchanger that is provided outdoors,
    said second heat exchanger is an indoor heat exchanger that is provided indoors, and
    said controller increases the speed of rotation of the fan of said second heat exchanger when the possibility of condensation in the vicinity of said cooling element is judged to be at or higher than the given level during cooling operation.

9. The heat exchange system according to claim 6, wherein said first heat exchanger is an outdoor heat exchanger that is provided outdoors,
    said second heat exchanger is an indoor heat exchanger that is provided indoors, and
    said controller increases the speed of rotation of the fan of said first heat exchanger when the possibility of condensation in the vicinity of said cooling element is judged to be at or higher than the given level during heating operation.

10. The heat exchange system according to claim 6, wherein said first heat exchanger is an outdoor heat exchanger that is provided outdoors,
    said second heat exchanger is an indoor heat exchanger that is provided indoors, and
    said controller reduces the speed of rotation of the fan of said second heat exchanger when the possibility of condensation in the vicinity of said cooling element is judged to be at or higher than the given level during heating operation.

11. The heat exchange system according to claim 1, wherein said permanently fixed throttle is a capillary tube.

12. The heat exchange system according to claim 1, wherein said variable throttle is an opening-and-closing expansion valve capable of adjustment of a valve lift.

13. A heat exchange system comprising:
    a first heat exchanger;
    a second heat exchanger;
    a compressor provided on a first path that is one of two paths connecting said first heat exchanger and said second heat exchanger, said compressor compressing a refrigerant;
    a variable throttle provided on a second path of the two paths connecting said first heat exchanger and said second heat exchanger, said second path being a path opposite to the path on which said compressor is provided;

a permanently fixed throttle provided on said second path;

a cooling element that is provided on said second path and that cools an object to be cooled, said cooling element being located between said variable throttle and said permanently fixed throttle;

a check valve provided on a bypass passage that connects a first branch position and a second branch position in parallel with said permanently fixed throttle, said first branch position being on a side of one end of said permanently fixed throttle and said second branch position being on a side of another end of said permanently fixed throttle, wherein said variable throttle and said permanently fixed throttle are located in series on said second path, refrigerant that flows through one of the permanently fixed throttle and the variable throttle flows into to the cooling element, and then flows to the other one of the permanently fixed throttle or the variable throttle, in this order, and said check valve is provided to allow said refrigerant to flow from said first branch position on the side of the end of said permanently fixed throttle that is farther from said cooling element to said second branch position on the side of the end of said permanently fixed throttle that is closer to said cooling element.

14. The heat exchange system according to claim 13, wherein said first heat exchanger functions as a condenser during cooling operation, and said permanently fixed throttle and check valve are both provided between said first heat exchanger and said cooling element.

15. The heat exchange system according to claim 13, wherein said second heat exchanger functions as a condenser during heating operation, and said permanently fixed throttle and check valve are both provided between said second heat exchanger and said cooling element.

16. A heat exchange system comprising:

a first heat exchanger;

a second heat exchanger;

a compressor provided on a first path that is one of two paths connecting said first heat exchanger and said second heat exchanger, said compressor compressing a refrigerant;

a variable throttle provided on a second path of the two paths connecting said first heat exchanger and said second heat exchanger, said second path being a path opposite to the path on which said compressor is provided; and a cooling element that is provided on said second path and that cools an object to be cooled, said cooling element having a permanently fixed throttle as at least part of piping inserted through said cooling element, wherein said variable throttle and said permanently fixed throttle are located in series on said second path, and refrigerant having flown through the variable throttle flows into the cooling element and then through the permanently fixed throttle, in this order.

17. The heat exchange system according to claim 16, wherein said variable throttle is provided between said second heat exchanger and said cooling element, and the heat exchange system is configured, during heating operation, to increase a flow rate of said variable throttle when a possibility of condensation in a vicinity of said cooling element is judged to be at or higher than a given level.

18. The heat exchange system according to claim 16, wherein said variable throttle is provided between said second heat exchanger and said cooling element, and the heat exchange system is configured, during cooling operation, to reduce a flow rate of said variable throttle when a possibility of condensation in a vicinity of said cooling element is judged to be at or higher than a given level.

19. The heat exchange system according to claim 16, wherein said variable throttle is provided between said first heat exchanger and said cooling element, and the heat exchange system is configured, during heating operation, to reduce a flow rate of said variable throttle when a possibility of condensation in a vicinity of said cooling element is judged to be at or higher than a given level.

20. The heat exchange system according to claim 16, wherein said variable throttle is provided between said first heat exchanger and said cooling element, and the heat exchange system is configured, during cooling operation, to increase a flow rate of said variable throttle when a possibility of condensation in a vicinity of said cooling element is judged to be at or higher than a given level.

21. The heat exchange system according to claim 16, further comprising a controller that varies a speed of rotation of a fan of at least one of said first heat exchanger and said second heat exchanger when a possibility of condensation in a vicinity of said cooling element is judged to be at or higher than a given level.

22. The heat exchange system according to claim 16, wherein said permanently fixed throttle is a capillary tube.

23. The heat exchange system according to claim 16, wherein said variable throttle is an opening-and-closing expansion valve capable of adjustment of a valve lift.

* * * * *